(United States Patent Office — 3,598,642 — Patented Aug. 10, 1971)

3,598,642
PRINTABLE POLYSTYRENE SHEET MATERIAL
Ching Yun Huang, Minoo-shi, and Akitoshi Kashiwagi, Toyonaka, Japan, assignors to Japan Gas-Chemical Company, Inc., Tokyo, Japan
No Drawing. Continuation of application Ser. No. 623,251, Mar. 15, 1967. This application Nov. 12, 1969, Ser. No. 871,588
Claims priority, application Japan, Mar. 18, 1966, 41/16,911
Int. Cl. B32b *27/04, 27/20*
U.S. Cl. 117—138.8      12 Claims

ABSTRACT OF THE DISCLOSURE

Sheet material comprising a foamed polystyrene sheet as a substrate, at least one surface of said substrate having a continuous coating. Said coating comprises an inorganic pigment and 15 to 50 parts, calculated as solid content based on 100 parts by weight of the said inorganic pigment, of a binder consisting of 80 to 55% by weight of a water-insoluble synthetic polymeric binder and 20 to 45% by weight of a water-soluble synthetic polymeric binder and/or a natural polymeric binder. Paper-like sheet material has a concavo-convex depth of no more than 30 microns, a Bekk surface smoothness of no less than 200 seconds and a surface electric resistance of no more than $10^{11}$ ohm.

---

This application is a continuation application of application Ser. No. 623,251, filed Mar. 15, 1967, now abandoned.

This invention relates to a surface-treated foamed polystyrene sheet which is low in surface electric resistance, substantially free from water-repellency and excellent in surface smoothness, and particularly has an excellent printability and writing property.

Foamed polystyrene sheets have been used for many commercial articles and for industrial purposes, especially in the field of sundries and for packaging. They have many defects, however.

Conventional foamed polystyrenes have high surface electric resistance as their inherent property, and there is a considerable generation of static electricity in a secondary processing step such as rewinding, cutting and printing process. For this reason, it requires much labour to arrange these sheets in order, as compared with ordinary paper. There is also a defect that dusts are prone to be deposited on these sheets. In printing, the ink is restricted because polystyrene sheets tend to be attacked by a solvent, and actually, printing is carried out only by the use of a fast-drying aniline ink. In the case of offset and photogravure printing, a glossy beautiful printing cannot be obtained.

A highly water-repellent polystyrene sheet is unsuitable for writing with a general water ink and India ink used in office work or for printing with a water ink, and cannot be used as paper for general office work. Even if a printing ink relatively well transferable to the said sheet is used, printing effect is poor unless the amount of ink to be transferred is increased, because the surface of a foamed polystyrene sheet has many convexities and concavities. Also since the sheet itself has a poor ink acceptability the printing effect is bad. At the time of lithographic offset printing, jogging is difficult, and this is a great obstacle in this printing process.

Heretofore, as a method of lowering the surface electric resistance of a plastic sheet and preventing static electricity, the application of an antistatic surface active agent (U.S. Pat. 3,048,263, and Belgian Pat. No. 617,267), the application of a silicone compound (U.S. Pat. No. 2,917,401), and the blending of an antistatic surface active agent with polystyrene (French Pat. 1,320,376) have been known. But according to these methods, even if the specific substance is applied to a foamed polystyrene sheet, it is impossible to improve the surface smoothness, and the so treated sheet is unable to give good drying of ink and is poor in ink acceptability. Thus, the printability is poor and the effect is not continued.

An object of this invention is to provide a foamed polystyrene sheet having novel surface properties which makes it possible to remove the above-mentioned defects, and which is excellent in surface smoothness, resistance to soiling, cutability, printability and writing property.

Another object of this invention is to provide a sheet material comprising as a substrate a novel foamed polystyrene sheet which is capable of being used as general paper, machine coated paper and art paper.

Other objects and advantages of this invention will become apparent from the description which follows.

The above objects can be achieved according to this invention by a sheet material comprising a foamed polystyrene sheet as a substrate, at least one surface of the said substrate having a continuous coating comprising an inorganic pigment and a binder. More particularly, this invention concerns a sheet material comprising a foamed polystyrene sheet with a thickness of 0.03 to 2.8 mm. and a specific gravity of 0.07 to 0.8 as a substrate, at least one surface of the said substrate having a continuous coating comprising an inorganic pigment and 15 to 50 parts, calculated as solid content based on 100 parts by weight of the said inorganic pigment, of a binder consisting of 80 to 55% by weight of a water-insoluble synthetic polymeric binder and 20 to 45% by weight of a water-soluble synthetic polymeric binder and/or a natural polymeric binder, the said coating being present in an amount of 5 to 40 g. per square meter of the surface of the substrate, and said sheet having a concavo-convex depth of no more than 30 microns, a Bekk surface smoothness of no less than 200 seconds and a surface electric resistance of no more than $10^{11}$ ohm.

If desired, a dispersing agent may be added to the said inorganic pigment to prevent the flocculation of the pigment. It is also possible to add such a substance as an antifoaming agent, luminescent dyestuff, luminescent pigment, coloured pigment and coloured dyestuff. The inorganic pigment to be used according to this invention includes clays (kaolin such as kaolinite and halloysite, bentonite, attapulgite, Japanese acid clay, activated clay, and talc), zeolite, colloidal silica, calcium carbonate, titanium pigments such as titanium oxide and complex titanium oxide pigment, satin white, zinc pigments such as zinc sulfide, zinc oxide and complex zinc sulfide pigment, barium sulfate, calcium sulfate, silica, calcium sulfite and mixtures of these. The particle size of these inorganic pigments varies according to the type of the respective pigment used, but a size of no more than 40 microns is generally preferable. The following sizes are especially preferable for the specific pigments in view of the viscosity of the coating composition and the properties of the coated surface:

| | Microns |
|---|---|
| Clay | 0.1 to 0.5 |
| Calcium carbonate | No more than 10, preferably no more than 5. |
| Titanium pigment | No more than 1.5. |
| Zinc pigment | No more than 1.0. |
| Barium sulfate | No more than 3.0. |

Examples of the water-insoluble synthetic polymeric binder to be used in this invention are synthetic resin latices such as a styrene-butadiene copolymer latex, methyl methacrylate-butadiene copolymer latex, acrylic acid- butadiene copolymer latex, acrylonitrile-butadiene copolymer latex, carboxylated styrene-butadiene copolymer latex, and carboxylated methyl methacrylate-butadiene copolymer latex, and also synthetic resin emulsions such as polyacrylic ester emulsion, polyvinyl acetate emulsion, vinyl acetate-maleic ester copolymer emulsion, acrylic acid-vinyl acetate copolymer emulsion and styrene-acrylic acid copolymer emulsion. These latices and emulsions generally have a particle size in the range of 0.01 to 0.50 micron.

As the examples of natural polymeric binder to be used according to this invention, there are animal and vegetable proteins such as casein and soy bean protein, converted starches such as oxidised starch, hydroxylated starch, enzyme-converted starch and dextrin, cellulose derivatives such as methyl cellulose, hydroxyethyl cellulose, sulfoethyl cellulose and carboxymethyl cellulose, alginic acid and its salts such as sodium, magnesium and ammonium salt. Thes natural polymeric binders used in this invention are soluble in water or alkaline aqueous media. An example of the water-soluble synthetic polymeric binder is polyvinyl alcohol.

Examples of usable dispersing agents are sodium silicate, glass-like polyphosphoric acid salt such as sodium tetraphosphate, sodium tetrapyrophosphate and sodium hexametaphosphate, sodium lignosulfonate, sodium alkylsulfonate, and ammonia alkali casein. Examples of the antifoaming agent to be used are sulfonated oil, pine oil, amyl alcohol, alcohols higher than this, tributyl phosphate, silicone, and non-ionic or anionic low-foamable surface active agents. The luminescent dyestuff and pigment to be used includes sulfides of zinc, cadmium, strontium and calcium or mixtures of these, and fluorescent dyestuffs for processing paper and fibers. As the coloured dyestuff and pigment, ordinary organic and inorganic dyestuffs and pigments are usable.

The amount of the binder in the coating composition is 15 to 50 parts calculated as solid content based on 100 parts by weight of the inorganic pigment. The proportion of the water-insoluble synthetic polymeric binder in the binder is 80–55% by weight, based on the weight of the binder, and the amount of natural polymeric binder and/or water-soluble synthetic polymeric binder in the binder is 20–45% by weight, based on the weight of the binder. If necessity arises, 0.2 to 1.0 part of a dispersing agent may be added to the inorganic pigment. The use of a dispersing agent makes it possible for the water-soluble coating composition to have good flow property and dispersibility of pigments, and gives a good finishing of the final sheet such as the smoothness of the surface. This is the vary reason why the use of the dispersing agent is recommended. Moreover, if desired, 5 to 30 parts of the luminescent dyestuff and pigment or a coloured dyestuff and pigment and 0.1 to 1.0 part of the antifoaming agent may be added. The concentration of the coating composition calculated as solid content is 30 to 65%. It is preferable that the coating composition of the above-mentioned constituents should be applied to the substrate sheet in the form of an aqueous pigment dispersion.

The surface-untreated foamed polystyrene sheet usable according to this invention has a thickness of about 0.05 to 3.0 mm. and a specific gravity of 0.05 to 0.5, and should preferably be one having relatively less rough surface from a viewpoint of improvement of surface properties. The problem of surface roughness, however, can be solved by choosing the coating method and adjusting the coating weight within a specific range.

The application of a coating composition to a foamed polystyrene sheet is carried out by means of a knife, rod, air knife, roll, blade, brush or immersion coater roughly in the same manner as in the manufacture of an ordinary pigment-coated paper. The amount to be applied varies considerably depending upon the thickness of the substrate sheet, but is generally 5 to 40 g. per square meter of the surface of the said sheet. Unlike an ordinary paper formed by the connection of vegetable fibers with one another, the sheet of this invention is not lowered in strength when wet, and so it is easy to apply an aqueous coating composition by immersing the sheet therein. Drying is carried out by passing the coated sheet through a hot air drying furnace or by contacting it with a drying drum or roll at 40 to 90° C. for 5 to 60 seconds.

The so coated foamed polystyrene sheet is passed through super calender rolls or friction calender rolls at a temperature of 40 to 70° C. and a pressure of 10 to 100 kg./cm., and smoothened at the coated surface. When the coated surface is smoothened, the glossiness also tends to increase. But the sheets of this invention include not only those having a glossy surface but also those having a semiglossy or mat surface. The number of nips during calendering differs somewhat depending upon the thickness of the sheet to be treated, but is in general 2 to 6 times. Instead of, or in conjunction with, the above calender, a flint machine or brush machine may be used and the sheet can be smoothened by contacting it at room temperature without pressure with the said machine. According to the above-mentioned smoothening process of this invention, the coated surface of the sheet comes to have a smoothness represented by a concavo-convex depth of no more than 30 microns and a Bekk smoothness of no less than 200 seconds. The so obtained pigment-coated foamed polystyrene sheet is excellent in surface smoothness and gloss after printing.

In addition, a big feature of this invention is the improvement of the electric resistance of the surface. The untreated polystyrene sheet foamed has a surface electric resistance of no less than $10^{15}$ ohm, whereas the pigment-coated foamed polystyrene sheet obtained by the above-mentioned method has the electric resistance of no more than $10^{11}$ ohm, preferably no more than $10^6$ ohm. So there is no generation of static electricity, and such difficulties as the deposition of dusts, adhesion of the sheets with each other, poor processability (e.g., winding of the sheet around the roll and poor arrangement of the sheets) during cutting of many layers of paper and poor adhesion of printing ink have been overcome. Particularly, the sheet of this invention is remarkably improved in printability as compared with the conventional foamed polystyrene sheet. The curling phenomenon of the sheet coated on both surfaces has completely disappeared, and the processability is markedly improved as there is hardly any difficulty in the winding of the sheet about the roll at the time of printing and the jogging of the sheets.

The surface-treated foamed polystyrene sheet of this invention hardly possesses a water-repellency on the surface. The untreated foamed polystyrene sheet has a water-repellency of 5 (TAPPI, RC Method, RC–212; rolls off perfectly), whereas the surface-treated foamed polystyrene sheet of this invention has a water-repellency of 0 (continuous trail—even width) to 2 (continuous trail—occasionally broken, definitely, narrower than drop).

The sheet of this invention can be used similarly to the conventional paper for water ink, India ink and fast-drying ink. The amount of ink to be transferred is also increased, and by aniline printing and offset printing, printing of a higher density than in the untreated one can be effected, and a high grade printing can be effected on the sheet similarly to the conventional art paper.

A comparison of the sheet material of this invention with the untreated foamed polystyrene sheet and various kinds of paper is tabulated in Table 1 in respect to properties.

TABLE 1

| Properties | Surface-treated foamed polystyrene sheet | Untreated foamed polystyrene sheet | Art paper | Machine-coated paper | High grade paper | News-print |
|---|---|---|---|---|---|---|
| Thickness (mm.) | 0.03–2.8 | 0.05–3.0 | | | | |
| Specific gravity | 0.07–0.8 | 0.05–0.51 | 1.1–1.3 | 1.0–1.3 | 0.7–1.2 | 0.4–0.7 |
| Concavo-convex depth ($\mu$) | [1] 30 | 20–100 | 3–5 | 7–10 | 11–35 | 20–40 |
| Bekk surface smoothness (sec.) | [2] 200 | [1] 200 | 1,000–2,000 | 200–1,000 | 20–100 | 20–40 |
| Gloss (percent) | 15–95 | 10–90 | [2] 60 | | | |
| Surface electric resistance ($\Omega$) | 1,011 | [2] 1,015 | | | | |
| Ink acceptability (percent) | 30–50 | [1] 20 | 40–60 | 30–60 | 20–70 | 30–90 |
| Water repellency | 0–2 | 5 | 0–2 | 0–2 | 0–2 | 0–2 |
| IGT pick resistance (cm./sec.) | 70–250 | | 50–300 | | | |

[1] No more than.
[2] No less than.

NOTE.—These properties were measured at a temperature of 20° C. and at a relative humidity of 65%. The ink acceptability is a value expressed by the formula y/x×100, where x represents the amount of ink (g.-m.$^2$) initially applied onto the plate of a printing machine, and y represents the amount of ink (g./m.$^2$) transferred onto paper or sheet after printing.

Thus, according to this invention, it is possible to provide a novel sheet material which has an excellent surface smoothness represented by a high Bekk smoothness and small concavo-convex depth, an excellent printability and writing property represented by a combination of the above-mentioned properties, a very low water-repellency and IGT pick resistance similar to art paper, and an excellent cuttability and resistance to soiling represented by a low surface electric resistance.

Now, this invention will be explained specifically with reference to the following working examples, by which this invention is in no way limited.

The methods of measuring the various properties and the testing apparatuses mentioned in the examples are shown in Table 2 below.

TABLE 2

| Properties | Method of measurement | Measuring apparatus |
|---|---|---|
| Gloss | TAPPI Standard T 480 (ts 65) (specular gloss at 75°). | Glossmeter GM-3. |
| Bekk surface smoothness. | TAPPI Standard, T 479 (Sm-48) (smoothness of printing paper). | Bekk smoothness tester. |
| Convavo-convex depth. | JIS (Japanese Industrial Standard) B-0601 (1955) (surface roughness and waviness). | Surface roughness tester. |
| IGT pick resistance. | Method according to Institute Voor Grafische Techniek Tno (Holland). | IGT printability tester. |
| Surface electric resistance. | Method according to JIS-K-6911. | (1) Ultra megohm-meter SM-10. (2) Super megohm-meter SM-3. |
| Water-repellency. | TAPPI-Routine control methods RC-212 (water-repellency of paper-sliding drop method). | Sliding drop tester. |

EXAMPLE 1

Clay (China clay SPS) for paper treating (1060 g.) 380 g. of a methylmethacrylate-butadiene copolymer latex (Copolex #1001, manufactured by Japan Gas Chemical, Inc. solid content being 50%), 400 g. of a 15% aqueous solution of ammonia casein, 80 g. of a 5% aqueous solution of sodium tetrapyrophosphate and 1 g. of sulfonated oil were thoroughly mixed by means of a kneader to form a coating composition whose solid content is 50%. The so formed coating composition was applied to both surfaces of a foamed polystyrene sheet with a thickness of 0.5 mm. and a specific gravity of 0.12 by means of an air knife coater with an air knife pressure of 0.1 kg./cm.$^2$, a distance between the sheet and air knife lip of 3 mm., a sheet transferring speed of 100 m./min., a hot air drying furnace temperature of 60° C., and a coating pan temperature of 25° C. The coated sheet was then passed through super calendering rolls (chilled surface) four times at a temperature of 55° C. and a pressure of 50 kg./cm.

The resulting pigment-coated foamed polystyrene contained the coating in an amount of 15 g./m.$^2$, and had a gloss of 50% at an incidence angle of 75°, a surface Bekk smoothness of 1400 seconds, a concavo-convex depth of 6 to 9 microns, an average IGT pick resistance of 220 cm./sec. grade black for pick test ink, tack No. 1, printing pressure of 35 kg./cm.$^2$, spring drive A, 20° C., 65% RH), a surface electric resistance of no more than 10$^6$ ohm, and a surface water repellency of 0.

Many of these sheets were accumulated in layers and cut by means of a guillotine cutter and rotary cutter. But there was observed no trouble in jogging operation and winding onto the roll which is caused by the generation of static electricity, and sheet cutting could be effected in roughly the same manner as general paper.

Offset printing was effected on the obtained sheet. There occurred no winding of the sheet around the roll, and jogging could well be carried out. The ink acceptability was about 50%, which is close to the value of art paper and about three times as much as the value of the untreated foamed polystyrene sheet. The printing density was large, and the printing effect was very excellent. Writing by fast-drying ink or water ink could readily be done without difficulty.

Likewise, coating compositions of the same compounding ratio were prepared in the same manner with the use, instead of the said methyl methacrylate-butadiene copolymer latex, of a styrene-butadiene copolymer latex (Dow latex #612, manufactured by Dow Chemical Co.; solid content being 47%), an acrylic acid-butadiene copolymer latex, an acrylonitrile-butadiene copolymer latex (Hycar 1552, manufactured by Japanese Geon Company; solid content being 52%), polyacrylic ester emulsion (Primal B–15, manufactured by Rohm & Haas Company), acrylic acid—vinyl acetate copolymer emulsion (Yodosol #3700, manufactured by Kanegafuchi Boseki Kabushiki Kaisha), and polyvinyl acetate type emulsion (Nikasol CL100–B, manufactured by Nippon Carbide Kogyo Kabushiki Kaisha), respectively. Each of the so obtained coating compositions was applied to a foamed polystyrene sheet. The coated sheets had roughly the same properties.

EXAMPLE 2

Eight hundred and fifty (850) grams of clay for treating paper (Zeeklite AT), 100 g. of precipitated calcium carbonate, 50 g. of titanium dioxide (anatase type; Tipaque A–250, manufactured by Ishihara Sangyo Kaisha), 400 g. of latex composed of 240 g. of a methyl methacrylate-butadiene copolymer latex (Copolex #1001, manufactured by Japan Gas Chemical Inc.; solid content being 50%) and 160 g. of a styrene-butadiene copolymer latex (Dow latex #612, manufactured by Dow Chemical Co.: solid content being 47%), 400 g. of a 15% aqueous solution of ammonia casein, 75 g. of a 5% aqueous solution of sodium hexametaphosphate and 1 g. of sulfonated oil were thoroughly mixed by means of a kneader to form a coating composition having a solid concentration of 60%. The so obtained coating composition was applied to both surfaces of a foamed polystyrene sheet having a thickness of 0.75 mm. and a specific gravity of 0.1 by means of a trailing blade coater with a blade of 0.38 mm. thickness with a sheet transfer rate of 80 m./min., a hot air drying furnace temperature of 50° C., and a coating composition temperature of 25° C. The coated sheet was passed through calender rolls of 60° C. and 25 kg./cm. with four times of nipping.

The resulting pigment-coated foamed polystyrene sheet had a coating content of 20 g./m.$^2$, gloss at an incidence angle of 75° of 40% on the surface subjected to the chilled roll, Bekk surface smoothness of 1200 seconds, concavo-convex depth of 8–10 microns, IGT pick resistance under the same conditions as in Example 1 of 200 cm./sec. on an average, surface electric resistance of no more than 10$^6$ ohm, and surface water repellency of 0.

The sheet had the same excellent guillotine cutter or rotary cutter cuttability, offset printability, ink acceptability, printing effect, and fast-drying ink and water ink writing property as in Example 1.

EXAMPLE 3

One thousand sixty (1,060) grams of clay for treating paper (China clay-SPS), 480 g. of a methylmethacrylate-butadiene copolymer latex (Copolex #1001, manufactured by Japan Gas Chemical, Inc.; solid content being 50%), 750 g. of a 20% aqueous solution of oxidised starch (Nisshoku MS #3600, manufactured by Nippon Shokuhin Kagaku Kogyo Kabushiki Kaisha), 100 g. of a 5% aqueous solution of sodium tetrapyrophosphate, and 1 g. sulfonated oil were thoroughly mixed by means of a kneader to form a coating composition with a solid concentration of 50%. The obtained coating composition was applied to a foamed polystyrene sheet with a thickness of 0.5 mm. and a specific gravity of 0.12 by means of an air knife coater, dried and calendered under the same conditions as in Example 1 and tested as in Example 1. The resulting sheet had a degree of gloss of 47%, Bekk surface smoothness of 1100 seconds, concavo-convex depth of 9 to 13 microns, IGT pick resistance of 180 cm./sec. on an average, a surface electric resistance of no more than 10$^6$ ohm, and water repellency of 0. With respect to multilayer cuttability and printability, about the same results as in example were obtained.

Likewise, a coating composition with a solid concentration of 40% was prepared from the same constituents as above except that 800 g. of a 15% aqueous solution of polyvinyl alcohol (Gosenol P–610, manufactured by Nippon Gosei Kagaku Kogyo Kabushiki Kaisha) replaced the 750 g. of a 20% aqueous solution of oxidised starch. The so obtained coating composition was applied to a foamed polystyrene sheet. The resulting sheet had a gloss of 49%, Bekk surface smoothness of 1400 seconds, concavo-convex depth of 7 to 11 microns, average IGT pick resistance of 190 cm./sec., surface electric resistance of no more than 10$^6$ ohm, and surface water repellency of 0. With respect to multilayer cuttability and printability, roughly the same results as above were obtained.

EXAMPLE 4

Five hundred and fifty (550) grams of clay for treating paper (Georgia kaolin), 300 g. of satin white, 150 g. of barium sulfate, 40 g. of a 5% aqueous solution of sodium hexametaphosphate, 520 g. of a polyacrylic ester emulsion (Primal AC–33, manufactured by Rohm and Haas), 800 g. of a 15% aqueous caustic soda solution of soy bean protein and 2 g. of antifoaming agent (pine oil) were thoroughly mixed by means of a kneader to form a coating composition with a solid concentration of 45%. The so obtained coating composition was applied to both surfaces of a foamed polystyrene sheet with a thickness of 0.5 mm. and a specific gravity of 0.12 by means of an air knife coater under the same conditions as in Example 1. The coated sheet was then passed through super calender rolls (chilled surface) of 50° C., and 50 kg./cm. with 5 times of nipping.

The so obtained pigment-coated foamed polystyrene sheet had a coating content of 20 g./m.$^2$, a gloss of 55%, Bekk surface smoothness of 1600 seconds, concavo-convex depth of 5 to 8 microns, IGT pick resistance on an average of 210 cm./sec., surface electric resistance of no more than 10$^6$ ohm, and surface water repellency of 0. The same results as in Example 1 were obtained with respect to multilayer cuttability and printability.

EXAMPLE 5

Eight hundred and fifty (850) grams of clay (China clay SPS), 50 g. of zinc sulfate, 100 g. of calcium sulfate, 40 g. of a 5% aqueous solution of sodium hexametaphosphate, 500 g. of a styrene-butadiene copolymer latex (Dow latex #636), 750 g. of a 20% aqueous solution of hydroxyethylated starch (Essun Gummy 280, manufactured by Ajinomoto Kabushiki Kaisha), 600 g. of a 15% aqueous solution of ammonia casein, and 2 g. of a antifoaming agent (Nopco DF 122, manufactured by Nopco Chemical Company, Inc.) were thoroughly mixed by means of a kneader to form a coating composition with a solid concentration of 50%. The so obtained coating composition was applied to both surfaces of a foamed polystyrene sheet with a thickness of 0.5 mm. and a specific gravity of 0.12 by means of dip and roll coater, dried at 65° C., and passed through super calender rolls (chilled surface) of 50° C. and 60 kg./cm. with 4 times of nipping.

The resulting pigment-coated foamed polystyrene sheet had a coating content of 18 g./m.$^2$, gloss of 56%, Bekk surface smoothness of 1500 seconds, concavo-convex depth of 8 to 10 microns, IGT pick resistance of 170 cm./sec. on an average, surface electric resistance of no more than 10$^6$ ohm and surface water repellency of 0. Almost the same results as in Example 1 were obtained with respect to multilayer cuttability and printability.

What is claimed is:

1. A graphic sheet material of improved printability comprising a foamed polystyrene sheet with a thickness of 0.03 to 2.8 mm. and a specific gravity of 0.07 to 0.8 as a substrate, at least one surface of said substrate having a continuous coating consisting essentially of an inorganic pigment and 15 to 50 parts, calculated as solid content based on 100 parts by weight of said inorganic pigment, of a binder consisting of 80 to 55% by weight of a water-insoluble synthetic polymeric binder and 20 to 45% by weight of a water-soluble binder selected from the group consisting of a water-soluble synthetic polymeric binder and a water-soluble natural polymeric binder, said coating being present in an amount of 5 to 40 grams per square meter of the surface of the substrate, and said sheet having a concavo-convex depth of not more than 30 microns, a Bekk surface smoothness of not less than 200 seconds and a surface electric resistance of not more than 10$^{11}$ ohms.

2. The sheet material according to claim 1 wherein the water-insoluble synthetic polymeric binder is a copolymer of butadiene with a monomer selected from the group consisting of styrene, methyl methacrylate, acrylic acid and acrylonitrile.

3. The sheet material according to claim 1 wherein the water-insoluble synthetic polymeric binder is a polymer selected from the group consisting of polyacrylic ester and polyvinyl acetate.

4. The sheet material according to claim 1 wherein the water-insoluble synthetic polymeric binder is an acrylic acid-vinyl acetate copolymer.

5. The sheet material according to claim 1 wherein the water-soluble synthetic polymeric binder is polyvinyl alcohol.

6. The sheet material according to claim 1 wherein the water-soluble natural polymeric binder is a protein selected from the group consisting of casein and soy bean protein.

7. The sheet material according to claim 1 wherein the water-soluble natural polymeric binder is a converted starch selected from the group consisting of oxidized starch and hydroxylated starch.

8. The sheet material according to claim 1 wherein the inorganic pigment is selected from the group consisting of kaolin, calcium carbonate, titanium pigment, satin white, zinc pigment, barium sulfate and calcium sulfate.

9. The sheet material according to claim 1 wherein the said coating contains 0.2 to 1.0 part, based on 100 parts by weight of the inorganic pigment, of a dispersing agent.

10. The sheet material according to claim 9 wherein the said dispersing agent is a polyphosphate selected from the group consisting of sodium tetrapyrophosphate and sodium hexametaphosphate.

11. The sheet material according to claim 1 having a surface with an electric resistance of not more than $10^6$ ohms.

12. A graphic sheet material of improved printability comprising a foamed polystyrene sheet with a thickness of 0.03 to 2.8 mm. and a specific gravity of 0.07 to 0.8 as a substrate, at least one surface of said substrate having a continuous coating consisting essentially of an inorganic pigment and 15 to 50 parts, calculated as solid content based on 100 parts by weight of said inorganic pigment, of a binder consisting of (a) 80 to 55% by weight of a water-insoluble synthetic polymeric binder selected from the group of a copolymer of butadiene with a monomer selected from the group consisting of styrene, methyl methacrylate, acrylic acid and acrylonitrile, polyacrylic ester, polyvinyl acetate, and an acrylic acid-vinyl acetate copolymer, and (b) 20 to 45% by weight of a water-soluble binder selected from the group consisting of polyvinyl alcohol, casein, soy bean protein, oxidized starch and hydroxlated starch, said coating being present in an amount of 5 to 40 grams per square meter of the surface of the substrate, and said sheet having a concavo-convex depth of not more than 30 microns and a Bekk surface smoothness of not less than 200 seconds and a surface electric resistance of not more than $10^{11}$ ohms.

References Cited

UNITED STATES PATENTS

| | | | |
|---|---|---|---|
| 3,208,876 | 9/1965 | Dodge | 117—138.8 |
| 3,399,158 | 8/1968 | Huitson | 260—29.6 |

WILLIAM D. MARTIN, Primary Examiner

J. E. MILLER, JR., Assistant Examiner

U.S. Cl. X.R.

117—161, 164, 165; 161—247, 256